United States Patent

Eistert et al.

[11] 4,204,387
[45] May 27, 1980

[54] GEAR DRIVE FOR MULTIPLE ROW HARVESTER

[75] Inventors: Theodor Eistert, Neustadt; Gerhard Schmidt, Kirschau; Christian Noack, Guttau; Manfred Teichmann, Bischofswerda; Bernd Zumpe, Rathmannsdorf; Manfred Eidam, Wilthen; Hans-Peter Spaida, Neustadt; Stefan Rauschenbach, Grosspostwitz; Karlheinz Paulisch, Kirschau; Siegfried Scholz, Wilthen, all of German Democratic Rep.

[73] Assignee: Veb Kombinat Fortschritt Landmaschinen Neustadt In Sachsen, Neustadt in Sachsen, German Democratic Rep.

[21] Appl. No.: 913,234

[22] Filed: Jun. 6, 1978

[30] Foreign Application Priority Data

Jun. 6, 1977 [DD] German Democratic Rep. .................................. 1199317

[51] Int. Cl.² .............................................. A01D 45/00
[52] U.S. Cl. .................................... 56/98; 56/DIG. 6
[58] Field of Search ................ 56/6, 10.1, 10.6, 10.7, 56/10.3, 11.1, 11.4, 98, DIG. 6, 12.3

[56] References Cited

U.S. PATENT DOCUMENTS

| | | | |
|---|---|---|---|
| 3,094,831 | 6/1963 | Boldrin | 56/11.1 |
| 3,311,186 | 3/1967 | Kamlukin | 56/11.1 |
| 3,507,102 | 4/1970 | Kline et al. | 56/12.3 |
| 3,524,306 | 8/1970 | Reber | 56/12.3 |
| 3,585,789 | 6/1971 | Blanshine et al. | 56/98 |
| 3,589,110 | 6/1971 | Schreiner et al. | 56/11.7 |
| 3,604,185 | 9/1971 | Reber et al. | 56/6 |
| 3,623,300 | 11/1971 | Konig et al. | 56/6 |
| 3,736,733 | 6/1973 | Fell et al. | 56/98 |
| 4,084,396 | 4/1928 | Fritz et al. | 56/98 |
| 4,106,270 | 8/1978 | Weigand et al. | 56/98 |

*Primary Examiner*—Russell R. Kinsey
*Assistant Examiner*—Paul J. Hirsch
*Attorney, Agent, or Firm*—Karl F. Ross

[57] ABSTRACT

A row-crop harvester has a frame displaceable in a predetermined travel direction and formed with a plurality of forwardly open throats each provided with a respective conveyor chain each in turn spanned over a respective drive sprocket. Each such drive sprocket is carried on a respective drive shaft having a drive gear that meshes with the drive gears of the conveyor chains to each side. Each drive shaft with its respective sprocket and gear are together mounted in a respective housing bolted to the frame of the harvester and having a mounting flange whose outer periphery corresponds to the pitch circle of the respective drive gear. A main gear meshing with one of the drive gears rotates all of these drive gears simultaneously, and each conveyor chain has a stretch exposed in a respective throat of the machine which is opposite the stretch of the flanking chains for backward advance of cut crop.

15 Claims, 3 Drawing Figures

GEAR DRIVE FOR MULTIPLE ROW HARVESTER

FIELD OF THE INVENTION

The present invention relates to a multiple row-crop harvester. More particularly this invention concerns the drive system for the conveyor chains of such a harvester.

BACKGROUND OF THE INVENTION

A row-crop harvester set up simultaneously to harvest several rows of crop such as corn, sunflowers, or the like has a plurality of forwardly opening throats each adapted to receive a respective row of the crop. Extending backwardly along each of these throats is a stretch of a conveyor chain such as described in the commonly owned jointly filed application Ser. No. 913,233, whose entire disclosure is herewith incorporated.

Each of these chains is spanned over an idler sprocket and a drive sprocket, the latter normally being positioned at the rear or downstream end of the respective throat. A chopper has its intake at these downstream ends at an intake station. Each of the conveyors therefore conducts stalk-type crop which has been cut at approximately ground level back to the transfer location where it is taken in and chopped. The chopped crop can thereafter be blown directly into a following trailer or an alongside separate vehicle, or can be temporarily stored.

The drive sprockets at the rear ends of the chains normally are carried on upright shafts having at their lower ends bevel gears meshing with respective bevel gears carried on a horizontal shaft extending transverse to the direction of displacement of the machine. Play between each driven bevel gear and each drive bevel gear is compensated for by vertically displacing the driven gears.

In order to reduce the width of the device at the rear transfer station it is known to have some of the drive shafts shorter than others so that some of the bevel gears will lie in a plane above the others. Such an arrangement adds considerable height to the machine at this location and greatly complicates the drive system.

It is also known to reduce the overall width of the conveyor arrangement at the downstream end by providing the drive sprockets for the central chains somewhat forwardly of the drive sprockets for the side or outer chains. This requires, however, a second horizontal transverse drive shaft so that, although the overall width of the system at the transfer station is reduced, the construction costs are elevated considerably.

Thus all of the known systems have the considerable disadvantage that they are relatively complex and, therefore, quite expensive. Furthermore adjustment of any of the known systems is a relatively complex matter, as is the replacement of any of the drive sprockets or drive subassemblies for the drive unit.

OBJECTS OF THE INVENTION

It is therefore an object of the present invention to provide an improved multiple row-crop harvester.

Another object of this invention is the provision of an improved drive system for the conveyor chains of such a crop harvester.

A further object of the present invention is to provide such a drive system which is relatively compact and can be produced at relatively low cost, and which is also easy to service.

SUMMARY OF THE INVENTION

These objects are attained according to the present invention by mounting each of the drive sprockets on a respective upright driven shaft. A driven gear is mounted on each of these shafts and these gears together form a single gear train, with each of the shafts therefore counterrotating relative to the next shaft in the chain.

This drive system is therefore very compact and can be easily contained in a relatively small closed housing which will protect all of the critical drive elements in a manner hitherto impossible with the relatively bulky bevel-gear drives. The system also lends itself ideally to the mass production of its parts, as each of the drive shafts with its respective drive gear and the drive sprocket can be held in a respective housing boltable to the frame of the vehicle. Thus in case of failure it is possible simply to unbolt the one relatively small housing and replace it with another. This exchangibility is made even simpler by providing each of the housings with a mounting flange having a circular outer periphery corresponding to the pitch circle of the respective drive gear. The housings need then merely be bolted in place with these flanges touching each other to ensure perfect alignment of the respective gears.

According to another feature of this invention the shafts with the respective gears, sprockets and chains are arranged in pairs. An inner pair is flanked by a pair of outer pairs. The outer pairs are relative to the travel direction of the harvester behind the inner pair. Furthermore the exposed or working stretches of the chains of each pair are opposite, that is the one chain of each pair has its right-hand stretch exposed relative to the travel direction and the other chain of each pair has its left-hand stretch exposed. With such a system each pair of conveyor chains, therefore, forms a nip at the rear end of the throats to force the cut stalk-type crop back into the intake of the chopper. The displacement forwardly of the inner pair of sprockets does not result in poor feeding as the crop being advanced thereby will automatically become intertwined with the crop being pushed backwardly by the outer conveyors.

It is within the scope of this invention to use outer drive gears of smaller diameter than the inner drive gears to compensate for the fact that the throats of the outer drive gears are longer between their upstream and downstream ends and those of the inner drive gears, as the smaller drive gears will give a greater advance speed.

It is also within the scope of this invention to use chain or belt drives where necessary. Furthermore extra small spur gears could be provided between the above-described drive gears where they all should rotate in the same direction because the respective conveyor chains all have the same sides exposed.

SPECIFIC DESCRIPTION

Figure 1:
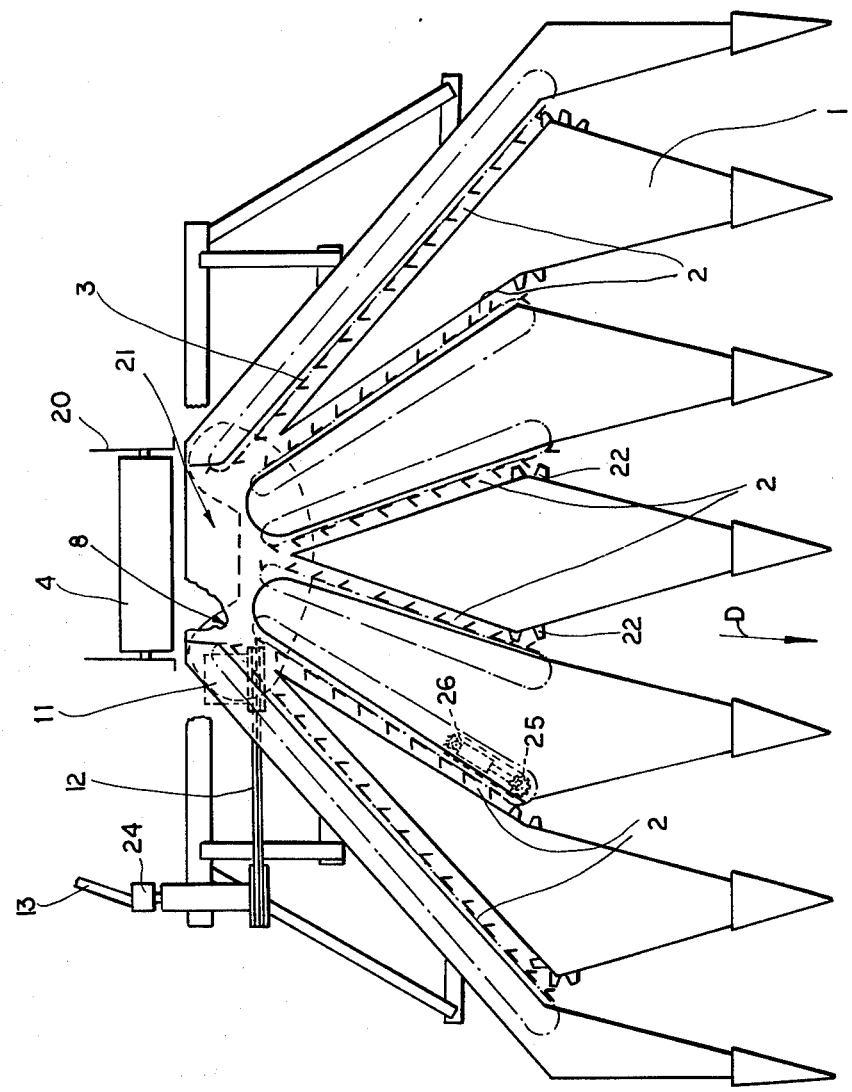
FIG. 1 is a top view of a crop harvestor according to this invention.

As shown in FIG. 1 a harvester according to the instant invention has a frame 20 provided with seven forwardly extending arms 1 forming six forwardly open throats 2 each having at its forward end a respective cutter starwheel 22 and in each of which is exposed a conveyor stretch of a conveyor chain 3 such as described in the above-cited commonly owned and jointly filed patent application. The frame 1 normally moves along the ground in a forward direction D parallel to the ground and each of the throats 2 receives a respective row of stalk crop. At the rear ends the throats 2 open at a transfer station 21 at the intake 4 of the chopper of the harvester.

Figure 3:
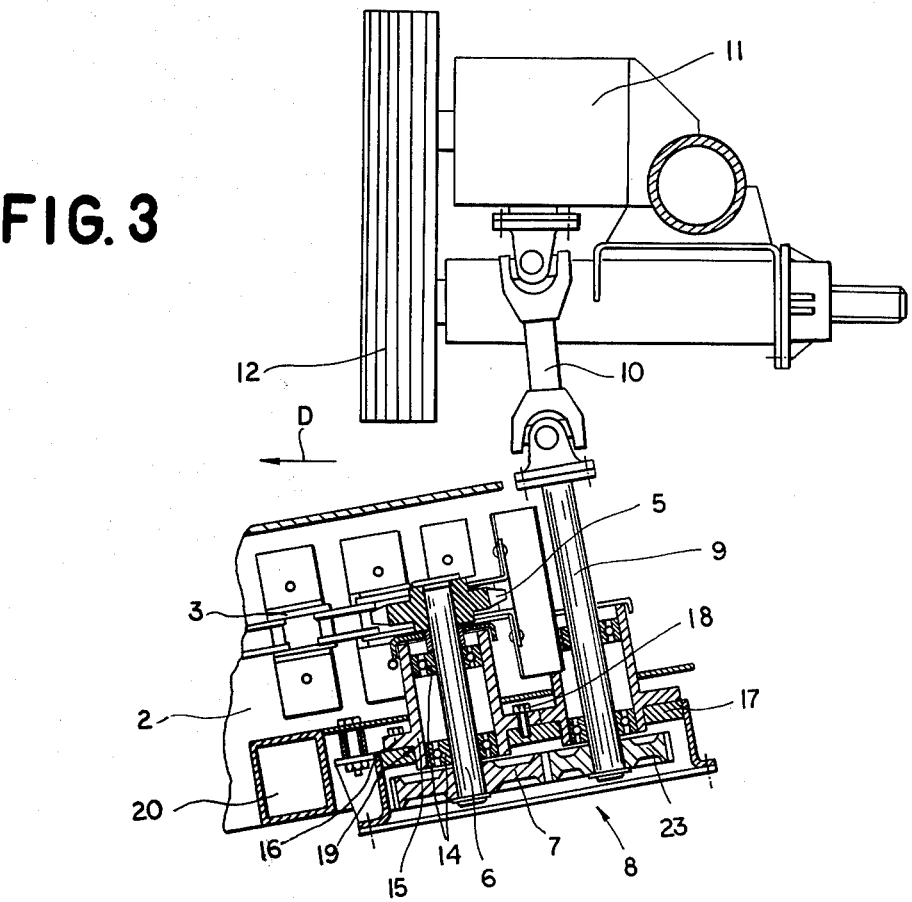
FIG. 3 is a section taken along the line III—III of FIG. 2.
Figure 2:
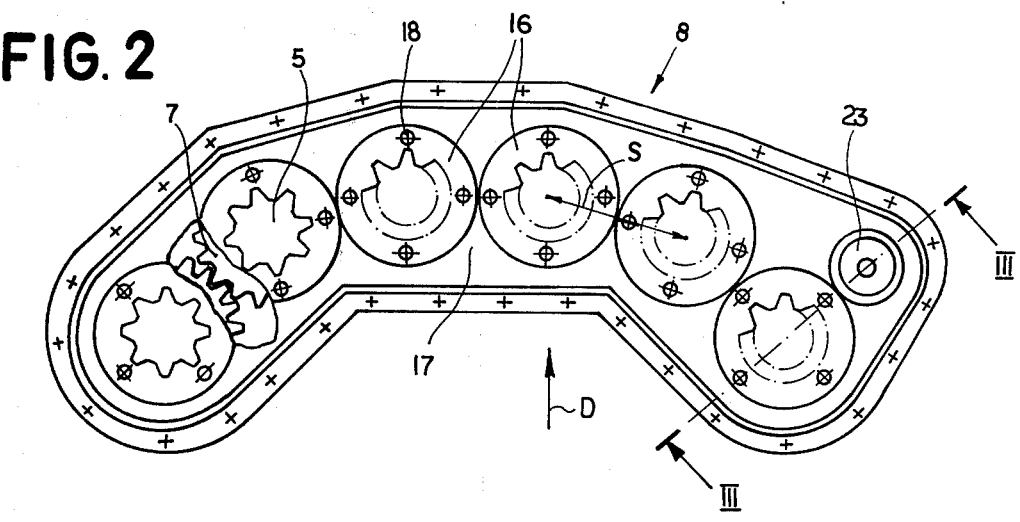
FIG. 2 is a top view of the drive system for the harvestor of FIG. 1.

As better shown in FIGS. 2 and 3 each of the chains 3 is spanned at its rear end over a drive sprocket 5 carried on a respective shaft 6 carrying in turn on its lower end a drive gear 7. The gears 7 all mesh with each other and relative to the direction of travel the right-hand end gear 7 also meshes with a gear 23 carried on a shaft 9 driven by means of a universal joint 10 and a right-angle drive 11 from a belt drive 12. This belt drive 12 in turn is connected through a magnetic clutch 24 to a drive shaft 13.

As described in the above-cited copending application each of the chains 3 is also spanned over a sprocket 25 biased by means of a fluid cylinder 26 away from the respective sprocket 5. Each cylinder 26 is normally pressurized at a predetermined level to maintain tension in the respective chain 3 and a pressure-responsive switch connected to each of the cylinders 26 opens the magnetic clutch 24 when pressure drops suddenly in the respective cylinder 26, indicating that the respective chain 3 is broken, or when pressure inside the respective cylinder 26 exceeds a predetermined level, indicating that the respective chain 3 is jammed.

Each of the shafts 6 is received in upper and lower roller bearings 14 carried in a respective cylindrical housing 15 having a circular mounting flange 16 securable to the mounting plate 17 of the gear train 8 formed by the gears 7. Each of these mounting flanges 16 is circular and has a diameter equal to that of the pitch circle of the respective gear 7. Bolts 18 secure these flanges 16 through slotted holes in the plate 17, to this plate 17 allowing limited displacement of the subassembly 19 on the plate 17. Since the outer peripheries of the flanges 16 are the same as the pitch circles of the gears 7 the units 19 are mounted in place with these flanges touching each other for perfect alignment of the respective gears 7. All of the units 19 are identical.

It is possible in accordance with this invention to change the spacing S between the outermost shafts 6 by forming the respective gears 7 somewhat smaller, thereby increasing the advance rate of the respective chains 3. Since the respective outer throats are inclined more steeply with respect to the direction D than the inner throats this insures continuous advance speed in this direction of cut crop.

As also shown in FIG. 1 opposite stretches of adjacent chains 3 are employed as conveyor stretches. This allows each of the conveyors 3 to act at its rear end in tandum with the conveyor chain 3 paired therewith. Crop being conveyed backwardly is therefore gripped between the two conveyors at the rear end. Since the central or inner conveyors terminate somewhat ahead of the outer conveyors this arrangement ensures that even the crop from the inner conveyor can be conveyed backwardly, as all of the crop will mingle and advance together into the relatively narrow intake 4 of the chopper of the harvester.

We claim:

1. A row-crop harvester comprising:
   a frame adapted to travel along the ground in a predetermined travel direction and forming a plurality of forwardly opening throats;
   a nonstraight row of drive sprockets each at one end of a respective one of said throats, said row including at least one inner sprocket flanked by at least two outer sprockets with said inner sprocket spaced in said direction from said outer sprockets;
   respective conveyor chains spanned over said drive sprockets and having respective stretches in the respective throats;
   respective drive shafts on said drive sprockets;
   respective drive gears on said drive shafts and together forming a nonstraight drive train with each drive gear meshing with at least one other gear, all of said gears lying generally in a common drive plane; and
   means for rotating one of said drive shafts and thereby rotating all of said drive gears with each drive gear rotating in a direction opposite that of any of said drive gears in mesh with itself.

2. The harvester defined in claim 1 wherein said shafts are all generally parallel.

3. The harvester defined in claim 1 wherein said shafts are equispaced apart measured radially of said shafts.

4. The harvester defined in claim 3 wherein at least two such inner sprockets are provided said shafts of said outer sprockets being closer to the closest shafts of said inner sprockets than said shafts of said inner sprockets are to each other measured perpendicular to said direction.

5. The harvester defined in claim 1 wherein said frame includes respective housings for each of said drive shafts and the respective sprocket and drive gear, said harvester further comprising bolts releasably securing each of said housings to said frame.

6. The harvester defined in claim 5 wherein each of said housings is provided with vertically spaced upper and low bearings for the respective shaft, said sprockets lying above the respective bearings and said drive gears lying therebelow.

7. The harvester defined in claim 6 wherein said frame includes an oil pan underneath and enclosing all of said gears.

8. The harvester defined in claim 6 wherein all of said housings, drive gears, shafts, and sprockets are identical.

9. The harvester defined in claim 1 wherein said stretches are to alternate sides of the respective throats from one side of said frame to the other in a direction transverse to said travel direction.

10. The harvester defined in claim 9 wherein two of said drive shafts are inner drive shafts and are flanked by said outer drive shafts.

11. The harvester defined in claim 1 wherein said gears are spur gears.

12. The harvester defined in claim 1 wherein said means includes a main gear meshing with one of said drive gears.

13. The row-crop harvester defined in claim 1 wherein said inner sprocket lies ahead of said outer sprockets in said direction.

14. The row-crop harvester defined in claim 13 wherein two such inner sprockets are provided ahead of said outer sprockets.

15. A row-crop harvester comprising:
- a frame adapted to travel along the ground in a predetermined travel direction and forming a plurality of forwardly opening throats;
- respective housings at the rear ends of said throats and having respective mounting flanges with predetermined like circular peripheries;
- means for releasably securing said housing to said frames with said peripheries sequentially tangent to one another and said flanges being generally coplanar;
- respective drive sprockets in said housings;
- respective conveyor chains spanned over said drive sprockets and having respective stretches exposed in the respective throats;
- respective drive shafts on said drive sprockets;
- respective drive gears on said drive shafts having pitch circles substantially corresponding to the diameters of the respective peripheries, said drive gears together forming a gear train with each drive gear meshing with between one and two other drive gears and all of said gears lying generally in a common drive plane; and
- means for rotating one of said drive shafts and thereby rotating all of said drive gears with each drive gear rotating in a direction opposite that of the drive gears in mesh with itself.

* * * * *